Jan. 23, 1951     C. A. CROME     2,538,832
AIR VALVE

Filed Sept. 24, 1948

CARL A. CROME
*INVENTOR.*

HUEBNER, BEEHLER,
WORREL, HERZIG & CALDWELL.
BY *Conrad C. Caldwell*
ATTORNEYS.

Patented Jan. 23, 1951

2,538,832

UNITED STATES PATENT OFFICE 2,538,832

AIR VALVE

Carl A. Crome, Wilmar, Calif.

Application September 24, 1948, Serial No. 51,066

5 Claims. (Cl. 84—339)

My invention relates to air valves, and is particularly useful in connection with controlling the supply of air to organ speaker pipes.

A standard-type pipe organ comprises a plurality of speaker pipes adapted to render different tones mounted on and communicating with an air chest or chamber. Compressed air or air under pressure is introduced into the pressure chamber and admitted to the speaker pipes in whatever sequence is necessary to result in a given musical composition. In such type construction, two problems are involved.

The first problem involved is one of noise. Most of the heretofore used types of speaker pipe valves have involved some type of mechanism adapted to pull a valve from a valve seat to control the admission of air. Such valves usually present a problem of noise upon closing. Numerous attempts have been made to silence these valves by the use of felt pads and the like. However, such efforts usually have proven unsatisfactory.

It is among the objects of my invention to provide a speaker pipe valve which may be readily opened or closed and yet which will emit no sound upon closing.

A further difficulty in the standard type of organ valve presents itself particularly in connection with the larger pipes. For example, when the air passage into the pipes reaches such diameters as 10" and the air pressure involved runs around 15 lbs. per square inch, a force of eleven hundred and fifty-seven lbs. is necessary to pull a valve from the valve seat because of the pressure over the entire face of the valve.

It is among the objects of my invention to provide a valve which can readily be opened regardless of the size of the passage upon the exertion of relatively small forces.

It has also been heretofore necessary to provide large spaces for housing the valves and the valve mechanism. Such space detracts from usable space so far as the speaker pipes are concerned and has resulted in unnecessary expense or unnecessarily large installation. A further object of my invention is to provide a speaker pipe valve which can be installed in a relatively small space and which installation is flexible with respect to position and location.

Other and further objects and advantages will become apparent from the drawings and the specifications relative thereto.

Figure 1:
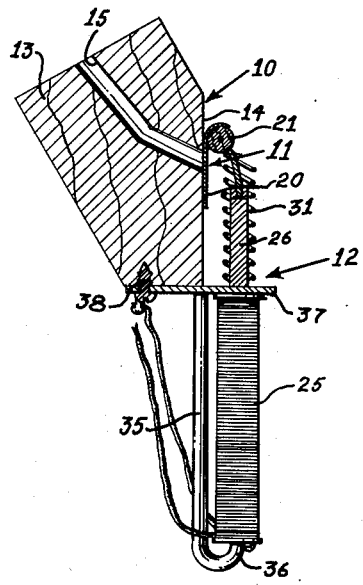
Figure 1 represents a side elevation, in section, of a valve employing the principles of my invention showing the valve closed.

My valve combination comprises essentially a valve body, designated generally 10, a valve, designated generally 11, and a valve-operating mechanism, designated 12.

The valve body is formed with a mounting face 13 and a valve seat face 14 having a bore 15 communicating therebetween.

It will be understood that the mounting face 13 is adapted to be mounted adjacent the inlet of the speaker pipe so that the bore 15 is in communication therewith. It is preferred to make the face 13 flat to facilitate mounting and sealing against unwanted air leaks.

The valve face 14 may be of any satisfactory configuration except that immediately adjacent the opening of the bore 15, the valve face 14 should be flat in order to effect a satisfactory seal.

A plurality of cross braces, such as a wire screen (not shown), should be disposed across the inlet opening of the bore 15 on the valve face side, particularly in larger size valves, to prevent the valve itself from being forced into the bore by air pressure.

The valve 11 comprises a flexible diaphragm 20 secured by such means as glue or cement to the high pressure side of the valve body and extending upwardly to completely cover the opening of the bore 15. The end of the diaphragm 20 is secured by cementing, gluing, or other satisfactory means to a roll 21. As will be seen in Figure 2 by rotating the roll 21 crosswise, the diaphragm 20 is lapped over the roll 21 and removed from obstructing the passage of air into the bore 15.

It will be apparent that exceedingly small forces can be employed to roll the diaphragm 20 over the roll 21 because only relatively small areas are being affected at any given period of time.

The valve diaphragm 20 should be formed of any relatively thin flexible material which is sufficiently tight in composition to prevent the passage of air, and which presents sufficient friction, both to the roll 21 and the face 14, to cause the roll to rotate rather than slide on a downward movement. I have found that such materials, as leather or rubber, give excellent results.

Figure 2:
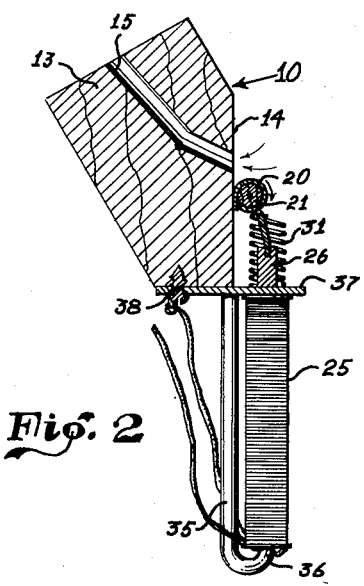
Figure 2 is a view similar to Figure 1 showing the valve open.
Figure 3:
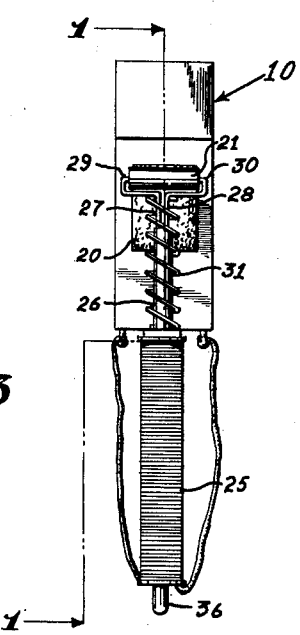
Figure 3 is a side elevation taken from the right in Figure 1.

The valve-operating mechanism 12 comprises an electromagnet 25 formed with an axial bore therethrough and having an armature 26 disposed therein so that upon energization of the magnet 25, the armature 26 will be pulled inwardly (downwardly on Figures 1 and 2). A yoke having a stem, illustrated here as a pair of wires 27 and 28, is secured to the armature 26 and is formed with inwardly directed pivot arms 29 and 30 disposed into the ends of the roll 21 so that the roll 21 is free to rotate on the pivot arms 29 and 30.

A compression spring 31 is disposed between the top of the magnetic coil 25 and the arms of the yoke to return the roll upwardly upon de-energization of the magnet 25. It will thus be seen that the contact made upon closing is a rolling contact and thus cannot make any noise.

The magnet 25 is secured to the valve assembly by means of a depending arm 35 having an upwardly turned end 36 upon which end the magnet 25 is mounted. The arm 35 is secured to a mounting plate 37 by means of welding, riveting or other satisfactory means. The mounting plate 37 mounts on the valve body 10 by means of wood screws 38 or such other suitable means as will securely hold the plate 37 to the body 10.

Whereas, I have shown a valve body 10 having a mounting face 13 at an angle oblique to the valve face 14, such a general configuration is not necessary, the important features being a relatively flat valve face and a relatively flat mounting face having a bore communicating therebetween. The angle between the faces will be determined by the particular installation and the angle at which the magnet must be mounted so as not to interfere with other parts of the organ.

While I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices.

Having described my invention, what I claim as new and desire to secure by Letters Patent is:

1. An air valve comprising a valve body having a bore therethrough, a flexible diaphragm secured adjacent said bore, a cylindrical roll disposed adjacent said bore and to one side thereof and having the other end of said diaphragm secured thereto so that when said roll is moved across said bore, said diaphragm will roll up on said cylindrical roll and expose said bore, means for causing displacement of said roll across said bore, said means comprising an electromagnet having a bore axially therethrough, an armature disposed in said bore and a yoke attached to said armature and to said cylindrical roll.

2. An air valve comprising a valve body having a bore therethrough and being formed with a relatively flat mounting face and a relatively flat valve face, a flexible diaphragm secured to said valve face adjacent said bore, a cylindrical roll disposed adjacent one side of said bore and to one side thereof and having the other end of said diaphragm secured thereto so that when said roll is moved across said bore, said diaphragm will roll up on said cylindrical roll and expose said bore, means for causing displacement of said roll across said bore, said means comprising an electromagnet having a bore axially therethrough, an armature disposed in said bore and a yoke attached to said armature and to said cylindrical roll.

3. An organ speaker pipe valve comprising a valve body having a bore therethrough, a mounting face and a valve face, said bore communicating between said faces, a valve adapted to close said bore on the valve face end, said valve comprising a sheet of relatively thin, flexible, airproof material having one end thereof secured to said valve face adjacent one side of said bore, a roll secured to the other end of said diaphragm on the other side of said bore, means for causing said roll to roll across and past said opening thereby causing said diaphragm to roll up on said roll to progressively expose said opening for the transmission of air therethrough, an electromagnet disposed adjacent said valve body, said electromagnet being formed with a bore axially therethrough, an armature disposed therein, said armature being operatively connected with said roll so that upon energization of said magnet, said armature will cause said roll to roll across the face of said valve opening.

4. An organ speaker pipe valve comprising a valve body having a bore therethrough, said bore having an inlet and an outlet end, a valve adapted to close said bore on the inlet end, said valve comprising a sheet of relatively thin, flexible, airproof material having one end thereof secured to said valve body adjacent one side of said bore, a roll secured to the other end of said diaphragm on the other side of said bore, means for causing said roll to roll across and past said opening, thereby causing said diaphragm to roll up on said roll to expose said opening for the transmission of air therethrough, said means comprising an electromagnet disposed adjacent said valve body, said electromagnet being formed with a bore axially therethrough, an armature disposed therein, said armature being operatively connected with said roll so that upon energization of said magnet said armature will cause said roll to roll across the face of said valve opening.

5. An air valve comprising a valve body having a bore therethrough, a flat face adjacent an entrance end of the bore, a flexible diaphragm adapted to lie on said face in a position closing the bore, said diaphragm having a portion secured along one side thereof to the valve body, a roller on the diaphragm secured to the diaphragm along a side opposite said first identified portion and adapted to roll said diaphragm upon itself to open the bore, an electromagnet having a hollow longitudinal aperture therein and secured to the valve body in a position transverse to the roller, a longitudinally movable armature in the aperture normally spring biased toward the roller, and a yoke on the armature having a rotatable attachment to the roller whereby when the magnet is energized the armature and roller are drawn in a direction adapted to roll said diaphragm on the roller away from the bore.

CARL A. CROME.

REFERENCES CITED

The following references are of record in the file of this patent:

UNITED STATES PATENTS

| Number | Name | Date |
| --- | --- | --- |
| 1,916,820 | Austin | July 4, 1933 |
| 1,957,585 | Gratian | May 8, 1934 |
| 1,986,956 | Brown et al. | Jan. 8, 1935 |